Jan. 14, 1936.  M. A. GOLDMAN  2,028,062
FILTER APPARATUS
Filed June 29, 1934
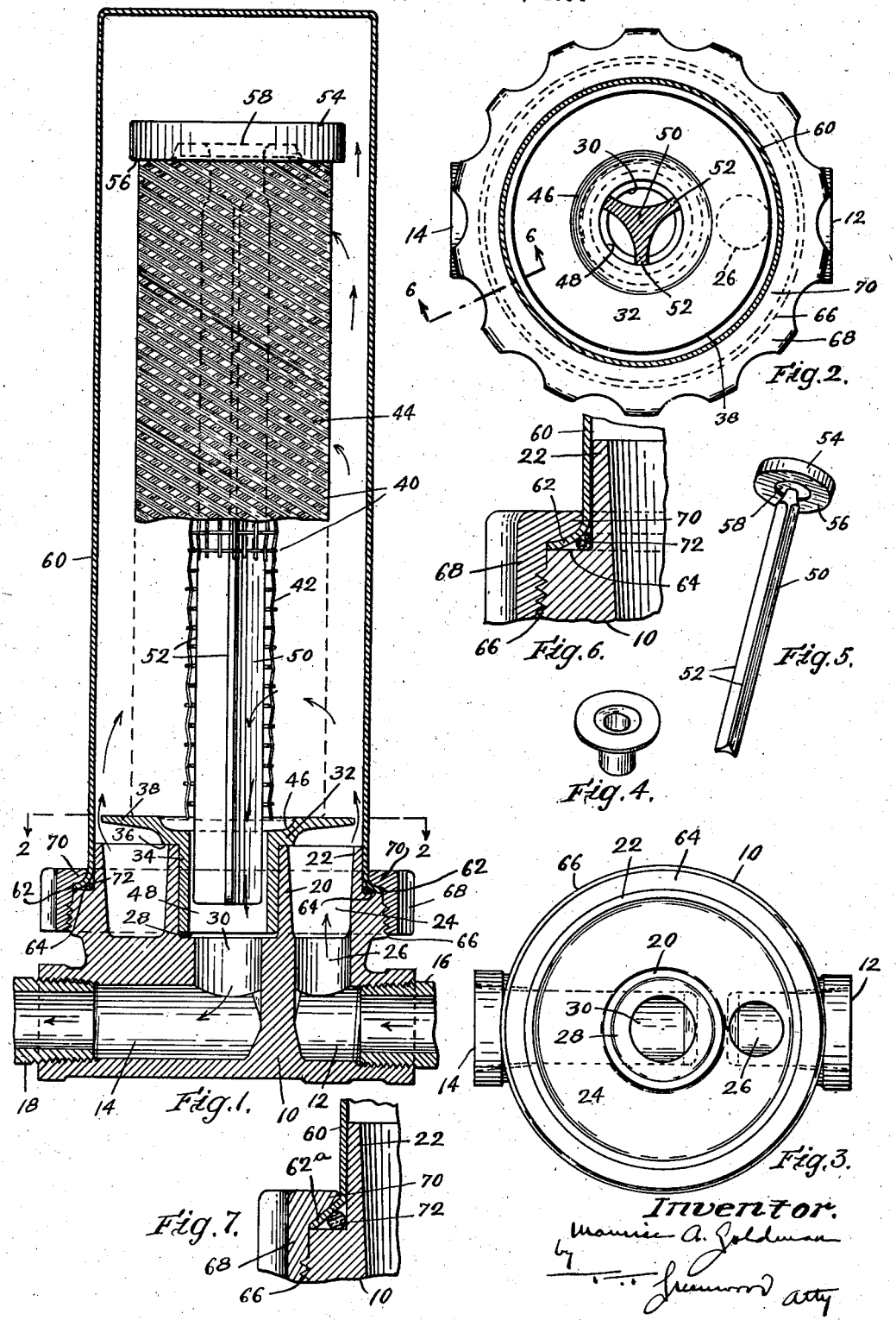

Patented Jan. 14, 1936

2,028,062

UNITED STATES PATENT OFFICE 2,028,062

FILTER APPARATUS

Maurice A. Goldman, Milford, N. H., assignor to Commercial Filters Corporation, Boston, Mass., a corporation of Massachusetts Application June 29, 1934, Serial No. 733,039

8 Claims. (Cl. 210—184)

This invention relates to filter apparatus especially designed for, although not necessarily limited to, the rapid filtering of liquids, especially liquids for human consumption, such a milk, where ease and thoroughness of cleaning the apparatus is essential.

The filter element of the apparatus is a tubular filter preferably of the type described and claimed in my Patent No. 1,958,286, dated May 8, 1934, comprising a foraminous core upon which is wound a multiplicity of layers of spaced convolutions of a nappy strand applied in a crisscross fashion to form a plurality of filtering passages in the side walls of the tube through which the liquid to be filtered is caused to pass.

One of the objects of the filter apparatus of the present invention is a construction wherein all the surfaces that come in contact with the milk are readily accessible for cleaning and wherein there is an absence of screw-threads and ledges that can not be readily cleaned.

A further object of the invention is the provision of a filter apparatus wherein the filter tube is held upon its seat by gravity and by the pressure of the liquid to be filtered whereby to eliminate the necessity for screw-threaded parts that heretofore have been used to secure the filter tube in operative position.

Another object of the invention is the provision of an improved form of filter apparatus that can be rapidly opened for cleaning without the removal of the apparatus from the piping system.

An additional object of the invention is the provision for a seal between parts of the apparatus by means of an axially long restricted passage between the parts combined with the seating of one part upon the other, with or without the use of an interposed gasket.

Another object is generally to improve the construction of filter apparatus.

Fig. 1 is a sectional elevation of a filter apparatus embodying the invention.

Fig. 2 is a sectional detail taken along line 2—2 of Fig. 1.

Fig. 3 is a plan view of the base of the filter apparatus.

Fig. 4 is a perspective view of a filter tube support.

Fig. 5 is a perspective view of a filter tube post.

Fig. 6 is a sectional detail taken along line 6—6 of Fig. 2 and illustrating the manner of securing and sealing the enclosing casing to the base.

Fig. 7 is a view similar to Fig. 6 and illustrating a modified construction.

The filter apparatus herein illustrated comprises a closed, pressure-retaining receptacle including a base 10 having an inlet passage 12 for the milk or other fluid to be filtered, and an outlet passage 14 for the filtered fluid. The two passages are in line and have suitably screwthreaded parts or are otherwise formed to receive pipes 16 and 18, respectively, of the fluid circulating system, the piping preferably constituting the support for the filter apparatus. The base 10 at the top thereof is provided with upstanding concentric inner and outer radially spaced annular walls 20 and 22, respectively, which define between them an open top annular channel or recess 24 which is in communication with the inlet passage 12 by a vertical passage 26 which opens into the bottom of the channel 24 and into the top of the inlet passage 12 and is approximately the full width of the channel 24 so that the channel and passage readily can be kept clean. The inner wall 20 surrounds a cylindrical open top recess 28 which communicates with the outlet passage 14 through a passage 30 in the bottom wall of the recess. The passage 30 is also of large diameter and is readily accessible its full length for cleaning purposes. A filter tube support 32 is carried removably by the base 10 and has a relatively long cylindrical neck 34 which is received snugly within the recess 28 and an outstanding shoulder 36 at the top of the neck which is seated upon the top of the wall 20. The close fitting neck 34 provides an axially long and greatly restricted passage that must be traversed by any fluid that leaks therethrough from the higher pressure fluid in the interior of the casing to the lower pressure fluid in the recess 28. The high resistance of the passage, combined with the tight seal between the shoulder 36 upon the top of the wall, practically seals the support and the base against leakage therebetween without the necessity of a special packing or gasket. Said support 32 also is provided with a radially outstanding flange 38 which overlies and is spaced above the top of the opening of the channel 24 and has a flat upper face on which the lower end of a filter tube 40 is removably seated. Said filter tube is or can be constructed as described in my above identified patent and comprises a foraminous core tube 42 formed of an open mesh screen. The foraminous core tube carries a plurality of layers of a thick nappy yarn 44 wound in spaced convolutions in a criss-cross manner and providing a plurality of well defined filter passages through the side wall of the filter tube and through which the fluid to be filtered is adapted to flow from the outside of the tube. The nap of the strand traverses the filter passages and entraps the foreign matter in the fluid. The ends of the winding on the foraminous core tube 42 are substantially flush with the ends of the core tube and the top face of the supporting flange 38 is provided with a recess 46 therein under the end of the core so that the end of the core can seat freely on the flange and imbed somewhat into the recess without hindrance from the core. The boss 34 is provided with a cylindrical passage 48 therethrough which communicates with the tube passage and with the outlet passage 14 to permit the flow of filtered fluid from the interior of the filter tube into the outlet. The filter tube is supported against lateral displacement on the flange 38 by a vertical post 50 which extends loosely and removably both through the foraminous core of the tube and into the passage 48 sufficiently to be held upright by engagement with the side wall of the passage. The post 50 is provided with a plurality of axially extended external flutes 52, three flutes being herein shown, which engage the foraminous core 42 and the side wall of the passage 48, the channels between the flutes providing for a free flow of the filtered fluid downwardly within the tube and into the outlet passage. The post is provided with an enlarged head 54 of substantial mass which overlies the top end of the filter tube and has a flat bottom face 56 that is seated by gravity upon the filter winding. Said face 56 is provided with a recess 58 around the post similar to the recess 46, so that the filtering mass on the foraminous core 42 can imbed somewhat into the recess without hindrance from the core. The head 54 and the support 32 seal the ends of the filter element so that the liquid to be filtered is constrained to pass inwardly of the filter element through the side wall thereof.

The filter element is enclosed within a cylindrical inverted shell or casing 60 that is closed at the top and open at the bottom and closely surrounds the annular outer wall 22 of the channel 24. The side wall of the casing at the lower open end thereof is reflexed outwardly to provide an outstanding annular flange 62 that is arcuate in cross section, as illustrated in Fig. 6, or is flat as indicated at 62a, Fig. 7. The base 10 is provided with an outstanding annular shoulder 64 upon which the edge of the flange of the casing is adapted to seat. The base also is provided with external screw-threads 66 on which a retaining ring 68 is screw-threaded removably, the retaining ring having an inwardly directed annular flange 70 conformed with the configuration of the casing flange and bearing against the top face thereof to clamp it upon the shoulder. The arrangement of the shoulder 64 and the flange 62, or 62a, is such that there is a space between the shoulder under the flange in which a resilient endless ring 72 is received to seal the casing and base against fluid leakage. The thickness of the ring is adapted to be such that the ring is compressed somewhat before the flange 62 is drawn upon the shoulder so as to be held compressed in fluid tight engagement with the base and the casing while at the same time the casing is seated directly upon the base. The casing is adapted to fit around the annular wall 22 of the base with small clearance and the wall 22 is adapted to be of substantial length axially of the casing so that the leakage path between the wall and the casing is relatively long and thus offers considerable resistance to the flow of liquid therethrough and hence assists the sealing ring 72 in keeping the casing fluid tight. The construction thus embodies the principle described in connection with sealing the filter tube support at the opening 30 to prevent direct communication between said inner recess 28 and the recess 24 concentric therewith.

With the arrangement shown the filter element 40 is supported on its supporting member 32 by its own weight combined with the weight of the post 50 and its head 56. The post 50 and its head have substantial weight so that the head is seated firmly upon the top of the filter element. The pressure of the fluid is greater within the casing 60 than within the foraminous core 42 and the outlet passage 14 and hence the pressure of the fluid acting upon the substantial area of the head 54 serves to hold the filter element firmly upon the support 32 without the necessity for any clamping means. By reason of this construction the use of screw-threads and the like, which are difficult to clean and to maintain clean, is obviated. The filter tube can be removed when desired. The tube support 32 can be removed from the base and all the surfaces that come in contact with the milk or other fluid to be filtered are readily accessible for cleaning. The arrangement is such that the parts can be cleaned without disconnecting the filter apparatus from its supporting pipes 16 and 18.

While the invention has been described in connection with a single filter tube the illustrated structure can be modified to adapt it to a plurality of filter tubes, without departure from the invention.

I claim:

1. Filter apparatus comprising a base having a filter tube support and a passage opening in said support, an enclosing casing connected with said base and surrounding said support, a tubular filter element within said casing seated at its bottom end on said support with its passage registering with said passage, and an exteriorly channeled post extended loosely through the passage in said filter element and received loosely in said passage, said post at its upper end having a head which overlies and is seated upon the top end of said filter element, and means providing a fluid passage to the interior of said casing.

2. Filter apparaus comprising a base, a casing secured to said base, a filter element support carried removably by said base within said casing, said base and support having registering passages, a tubular filter element seated loosely and removably at its bottom end upon said support and having its passage registering with the passage in said support, an exteriorly channeled post extended loosely and removably in the passages of both of said filter element and said support and holding said filter element against lateral displacement on said support, a cover plate loosely seated upon the top end of said filter element and constituting a closure for the passage, said cover plate having such mass as to press against the filter element and form a fluid tight seal therewith and to press the filter element against said support to form a fluid tight seal between said support and the bottom end of the filter element, and means providing a fluid passage to the interior of said casing.

3. Filter apparatus comprising a base, a casing secured to said base, a filter element support carried removably by said base within said casing, said base and support having registering passages, a tubular filter element seated at its bottom end upon said support and having its passage registering with the passage in said support, an exteriorly channeled post extended through said filter tube passage and having its lower end received loosely in the passage of said tube support, said post having a head at its upper end which is seated loosely upon the top end of said filter element, and means providing a fluid passage to the interior of said casing.

4. Filter apparatus comprising a base, an enclosing casing secured to said base, said base having a recess in its top face, a filter tube support seated upon said base and having a neck located removably within said recess, said base having a fluid passage communicating with said recess and said support having a passage through said neck communicating with said outlet passage, a tubular filter element seated at its bottom end upon said support with its passage in line with the passage in said support, a fluted post extended loosely through said filter element passage and loosely and removably into the passage of said support, said post having a head at its upper end which is seated loosely upon the top end of said filter element and overlies and seals said passage, and means providing a fluid passage into the interior of said casing.

5. Filter apparatus comprising a base having outer and inner radially spaced concentric annular side walls defining an open top channel, said base having a fluid inlet passage opening into said channel, said inner wall bounding an annular recess, said base having a fluid outlet passage communicating with the bottom of said recess, an enclosing casing secured to and upstanding above said base and having an open end surrounding said outer wall, a filter tube support located within said casing seated upon the top of said inner wall and having a neck which is removably positioned within said recess and a passage through said neck which communicates with said outlet passage, said support having a circumferentially outstanding flange which is spaced above and overlies the top of said channel, a tubular filter element having its bottom end seated upon said flange and its passage registering with the outlet passage in said support, and a fluted post located loosely within the passage of said filter element and having its lower end loosely and removably within the passage of said support and held upright by said support, said post having at its upper end an outstanding head which rests upon the top end of said filter element and constitutes a closure therefor.

6. Filter apparatus comprising a base having outer and inner upstanding concentric radially spaced annular walls which define between them an open top annular channel, said inner wall bounding an annular open top recess, said casing having inlet and outlet passages located below said channel and communicating respectively with said channel and recess, an enclosing casing carried by and upstanding above said base and having an open lower end surrounding said outer wall, a filter element support located within said casing and seated upon the top of said inner wall and having a neck which extends removably into said recess, and a passage through said neck communicating with said outlet passage, said support having a circumferentially outstanding flange which is spaced above and overlies the top of said annular channel constituting a seat for the bottom end of a tubular filter element, and an externally fluted post having its lower end received loosely and removably in the passage of said support, said post at its upper end having an outstanding head adapted to bear upon the top end of the filter element.

7. Filter apparatus comprising a receptacle including a base having recesses and inlet and outlet passages communicating with said recesses, a filter tube support seated on said base and sealing said recess against direct intercommunication, said support having an opening therethrough communicating with a recess, means whereby the other recess is in communication with the interior of said receptacle, a filter tube having a filter winding seated loosely and removably upon said support with its internal passage in communication with said opening, a channeled post located loosely and removably in the internal passage of said filter tube and also in the opening of said support for holding said filter tube thereon against lateral displacement, and a heavy cap seated loosely on the top of said filter tube winding over and sealing the upper end of said tube passage.

8. Filter apparatus comprising a receptacle adapted to contain fluid under pressure to be filtered, a filter tube support in said receptacle having a passage for the filtered fluid, and a filter tube seated loosely on said support around said passage with its internal passage in communication with said passage, said filter tube comprising a filter winding, and an exteriorly channeled post removably located in said filter tube passage having a head at its upper end which rests loosely upon the top of said filter tube winding, the lower end of said post being located loosely and removably in said support passage and holding said filter tube against lateral displacement, the pressure of fluid on said filter tube and head holding the bottom end of said filter tube winding in fluid tight contact with said support and said head in fluid tight contact with the top end of said filter tube.

MAURICE A. GOLDMAN.